US012640761B2

(12) United States Patent
Zhang et al.

(10) Patent No.: US 12,640,761 B2
(45) Date of Patent: May 26, 2026

(54) OPTICAL SIGNAL TRANSMISSION DEVICE AND METHOD BASED ON DIGITAL PREDISTORTION IN SYMBOL DOMAIN

(71) Applicant: FUJITSU LIMITED, Kawasaki (JP)

(72) Inventors: Ke Zhang, Beijing (CN); Zhenning Tao, Beijing (CN)

(73) Assignee: 1FINITY INC., Kawasaki (JP)

( * ) Notice: Subject to any disclaimer, the term of this patent is extended or adjusted under 35 U.S.C. 154(b) by 175 days.

(21) Appl. No.: 18/228,825

(22) Filed: Aug. 1, 2023

(65) Prior Publication Data

US 2024/0056109 A1 Feb. 15, 2024

(30) Foreign Application Priority Data

Aug. 11, 2022 (CN) .......................... 202210962480.4

(51) Int. Cl.
*H04B 1/04* (2006.01)
*H04B 10/50* (2013.01)

(52) U.S. Cl.
CPC ........... *H04B 1/0475* (2013.01); *H04B 10/50* (2013.01); *H04B 2001/0408* (2013.01)

(58) Field of Classification Search
CPC .............................. H04B 1/0475; H04B 10/50
USPC .......................................................... 398/193
See application file for complete search history.

(56) References Cited

U.S. PATENT DOCUMENTS 11,336,367 B1 * 5/2022 Oveis Gharan ...... H04B 10/075
2004/0067064 A1 4/2004 McNicol et al.

2008/0310479 A1 12/2008 Koslar et al.
2012/0141134 A1 6/2012 Hauske
2013/0051801 A1 2/2013 Kuschnerov et al.
2015/0098521 A1 4/2015 Beidas et al.
2016/0028487 A1 * 1/2016 Kan ........................ H04B 10/40
398/136

(Continued)

FOREIGN PATENT DOCUMENTS

CN 1378730 A 11/2002
CN 102742187 A 10/2012
CN 102763351 A 10/2012

(Continued)

OTHER PUBLICATIONS

Yao et al; the Design of a Square-Root-Raised-Cosine FIR Filter by a Recursive Method, 2005, IEEE, pp. 1-4. (Year: 2005).*

(Continued)

*Primary Examiner* — Amritbir K Sandhu
(74) *Attorney, Agent, or Firm* — STAAS & HALSEY LLP

(57) ABSTRACT

An optical signal transmission device and method based on digital predistortion in a symbol domain is provided. The optical signal transmission device includes: a memory; and a processor coupled to the memory to control execution of a process to: perform digital predistortion processing on a symbol sequence of a signal to be transmitted to obtain a digital predistortion processed signal; perform short-pulse shaping processing on the digital predistortion processed signal to obtain a short-pulse shaping processed signal, wherein a memory length introduced by the short-pulse shaping processing is less than or equal to a memory length of the optical transmitter; and generate and transmit an optical signal based on the short-pulse shaping processed signal.

9 Claims, 6 Drawing Sheets

(56)                References Cited

U.S. PATENT DOCUMENTS

2019/0319712 A1     10/2019   Zhang et al.
2023/0010592 A1 *   1/2023   Zhang .................... H04B 10/58

FOREIGN PATENT DOCUMENTS

CN          110380779  A      10/2019
CN          114039670  A       2/2022
EP            2713532  A1 *   4/2014   .......... H04B 10/616
WO    WO 2015/192112  A2     12/2015

OTHER PUBLICATIONS

Rene et al; Pulse-Shaping with Digital, Electrical, and Optical Filters—A Comparison ; 2013; Journal of Lightwave technology, vol. 31, No. 15; pp. 1-8. (Year: 2013).*
Weiner (Ultrafast optical pulse shaping: A tutorial review); Apr. 2011; Science direct; pp. 1-24. (Year: 2011).*
He et al; Symbol-Based Supervised Learning Predistortion for Compensating Transmitter Nonlinearity ; 2021; IEEE, pp. 1-5. ( Year: 2021).*
Zhou et al; Adaptive-memory-length look-up table (LUT)-based digital pre-distortion for IM/DD underwater wireless optical communications ; 2024; Optics Express vol. 32, No. 5, pp. 1-11 (Year: 2024).*
Wu et al., "Carrier-less Position/Phase Modulation for Visible Light Communications" Journal of Electronics Information Technology; vol. 23 No. 2; Feb. 2017; pp. 360-366.
Karam et al.; "Analysis of Predistortion, Equalization, and ISI Cancellation Techniques in Digital Radio Systems with Nonlinear Transmit Amplifiers" IEEE Transactions on Communications, vol. 37 No. 12; Dec. 1989.
Chinese Office Action issued Mar. 17, 2026 for Application No. 202210962480.4.
Zonglong He et al, Symbol-Based Supervised Learning Predistortion for Compensating Transmitter Nonlinearity, 2021 European Conference on Optical Communication.

* cited by examiner

_800_

OPTICAL SIGNAL TRANSMISSION DEVICE AND METHOD BASED ON DIGITAL PREDISTORTION IN SYMBOL DOMAIN

CROSS-REFERENCE TO RELATED APPLICATIONS

This application is based on and hereby claims priority to Chinese Application No. 202210962480.4, filed Aug. 11, 2022, in the China National Intellectual Property Administration, the disclosure of which is incorporated herein by reference.

TECHNICAL FIELD

This disclosure relates to the field of optical communications.

BACKGROUND

In an optical communication system, an optical transmitter generates an optical signal and transmits it. In the optical transmitter, a digital predistortion (DPD) technology is often used to solve a problem of nonlinear effect generated by the optical transmitter. Wherein, digital predistortion in a symbol domain, i.e. predistortion processing on a symbol sequence to be transmitted, is a commonly used digital predistortion technology. In addition, in an existing optical transmitter, a pulse shaping filter is generally needed to perform pulse shaping processing on signals.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

According to an aspect of the embodiments of this disclosure, there is provided an optical signal transmission device based on digital predistortion in a symbol domain, the optical signal transmission device being arrangeable in an optical transmitter, the optical signal transmission device including: a memory; and a processor coupled to the memory to control execution of a process to: perform digital predistortion processing on a symbol sequence of a signal to be transmitted to obtain a digital predistortion processed signal; perform short-pulse shaping processing on the digital predistortion processed signal to obtain a short-pulse shaping processed signal, wherein a memory length introduced by the short-pulse shaping processing is less than or equal to a memory length of the optical transmitter; and generate and transmit an optical signal based on the short-pulse shaping processed signal.

According to an aspect of the embodiments of this disclosure, there is provided an optical transmitter, including the optical signal transmission device as described herein.

According to an aspect of the embodiments of this disclosure, there is provided an optical signal transmission method based on digital predistortion in a symbol domain, the method being applicable to an optical transmitter, the method including: performing digital predistortion processing on a symbol sequence of a signal to be transmitted to obtain a digital predistortion processed signal; performing short-pulse shaping processing on the digital predistortion processed signal to obtain a short-pulse shaping processed signal, wherein a memory length introduced by the short-pulse shaping processing is less than or equal to a memory length of the optical transmitter; and generating and transmitting an optical signal based on the short-pulse shaping processed signal.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

3

4

Figure 10:
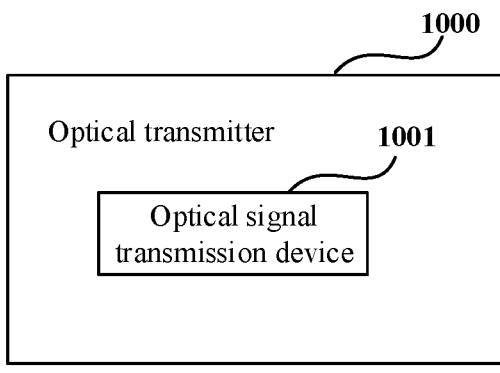
Figure 11:
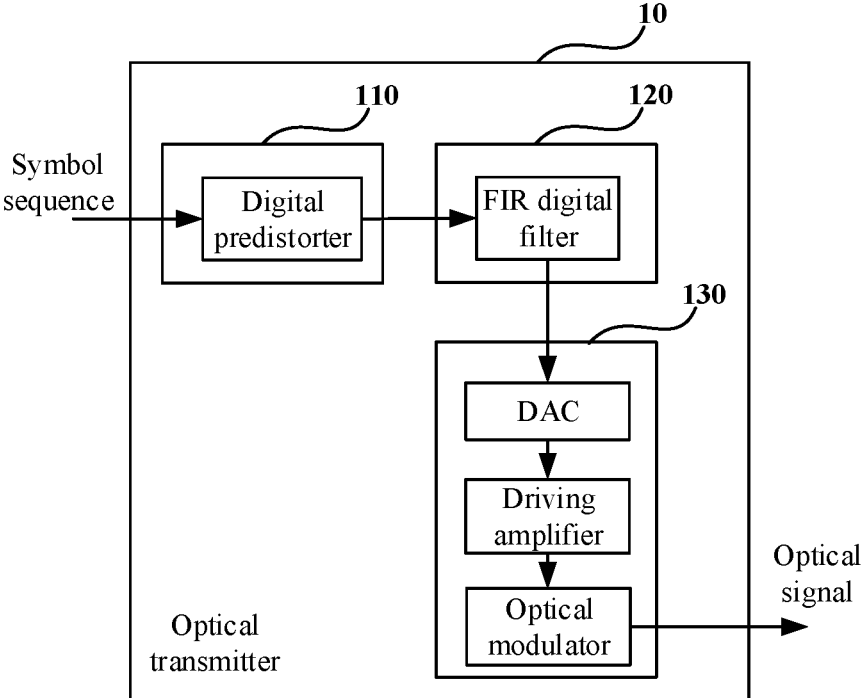
Figure 12:
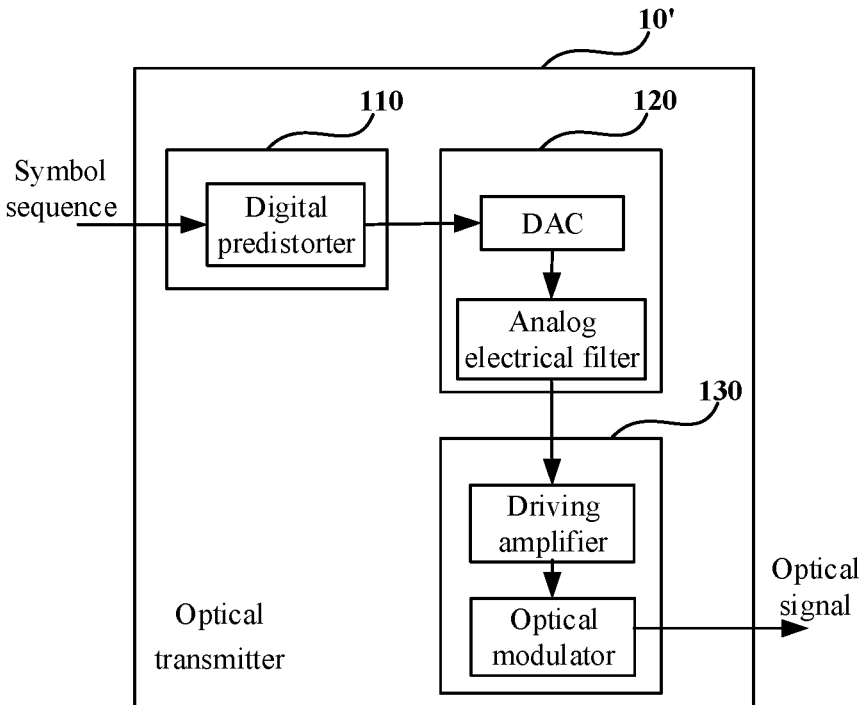
Figure 13:
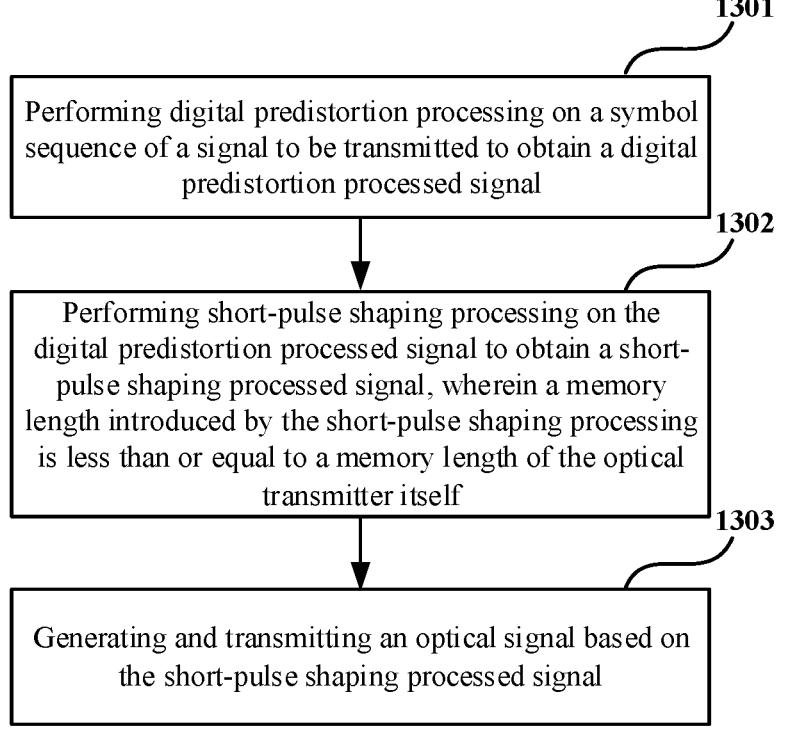

FIG. 10 is a schematic diagram of the optical transmitter according to an embodiment of this disclosure;

FIG. 11 is a block diagram of a systematic structure of the optical transmitter according to an embodiment of this disclosure;

FIG. 12 is another block diagram of the systematic structure of the optical transmitter according to an embodiment of this disclosure; and FIG. 13 is schematic diagram of the optical signal transmission method based on digital predistortion in a symbol domain according to an embodiment of this disclosure.

DETAILED DESCRIPTION

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

It was found by the inventors that pulse shaping introduces a certain memory effect, i.e. inter-symbol interference, into transmitted signals in advance, and strength of the memory effect is closely related to magnitude of a roll-off factor of a filter used in pulse shaping. Wherein, a larger roll-off factor has a weaker memory effect on pulse shaping, while a smaller roll-off factor has a stronger memory effect on pulse shaping.

For some application scenarios, such as a dense wavelength division multiplexing (DWDM) system, in order to improve efficiency of spectrum utilization and avoid inter-channel crosstalk, a very small roll-off factor is usually used, that is, a long pulse shaping method. For an optical transmitter based on digital predistortion in a symbol domain, a smaller roll-off factor will bring serious inter-symbol interference (ISI), resulting in an increase in a memory length of a nonlinear compensator of an optical receiver. The introduced inter-symbol interference will last for a long time, resulting in nonlinear distortion that is difficult to remove after a signal passes through subsequent nonlinear devices, and this nonlinear distortion is related to multiple earlier and later symbols. In other words, a conventional long pulse shaping method will fundamentally increase the memory length of the entire optical transmitter, which will lead to an increase in complexity of digital predistortion in the symbol domain, which is inconducive to actual deployment.

In order to solve at least one of the above problems, embodiments of this disclosure provide an optical signal transmission device and method based on digital predistortion in a symbol domain.

An advantage of the embodiments of this disclosure exists in that in the optical transmitter based on digital predistortion in the symbol domain, the digital predistortion processed signal is subject to short pulse shaping processing different from the conventional long pulse shaping processing, wherein the memory length introduced by the short pulse shaping processing is less than or equal to the memory length of the device of the optical transmitter itself. In this way, with the above short pulse shaping, the length of the correlation introduced between earlier and later symbols of the signal pulse in time is shortened and the intensity of this correlation is reduced, hence, the length of the memory effect of the entire optical transmitter may be shortened, thus effectively reducing complexity requirements of digital predistortion in the symbol domain, facilitating actual deployment, and ensuring the performance of digital predistortion.

Embodiment 1

Figure 1:
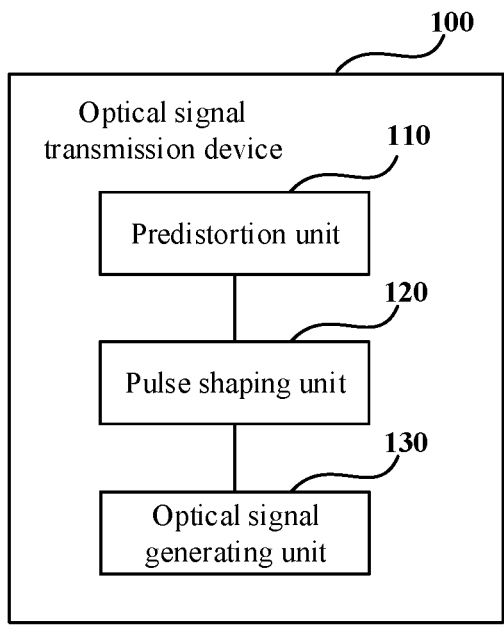
FIG. 1 is a schematic diagram of the optical signal transmission device based on digital predistortion in a symbol domain according to an embodiment of this disclosure.

The embodiment of this disclosure provides an optical signal transmission device based on digital predistortion in a symbol domain. FIG. 1 is schematic diagram of the optical signal transmission device based on digital predistortion in a symbol domain of Embodiment 1 of this disclosure.

As shown in FIG. 1, an optical signal transmission device 100 based on digital predistortion in a symbol domain includes:

a predistortion unit 110 configured to perform digital predistortion processing on a symbol sequence of a signal to be transmitted to obtain a digital predistortion processed signal;

a pulse shaping unit 120 configured to perform short-pulse shaping processing on the digital predistortion processed signal to obtain a short-pulse shaping processed signal, wherein a memory length introduced by the short-pulse shaping processing is less than or equal to a memory length of the optical transmitter itself; and an optical signal generating unit 130 configured to generate and transmit an optical signal based on the short-pulse shaping processed signal.

Hence, in the optical transmitter based on digital predistortion in the symbol domain, the digital predistortion processed signal is subject to short pulse shaping processing different from the conventional long pulse shaping processing, wherein the memory length introduced by the short pulse shaping processing is less than or equal to the memory length of the device of the optical transmitter itself. In this way, with the above short pulse shaping, the length of the correlation introduced between earlier and later symbols of the signal pulse in time is shortened and the intensity of this correlation is reduced, hence, the length of the memory effect of the entire optical transmitter may be shortened, thus effectively reducing complexity requirements of digital predistortion in the symbol domain, facilitating actual deployment, and ensuring the performance of digital predistortion.

In some embodiments, the optical signal transmission device 100 based on digital predistortion in a symbol domain is provided in the optical transmitter.

In some embodiments, the predistortion unit 110 performs digital predistortion processing on the symbol sequence of the transmitted signal, that is, performing digital predistortion in the symbol domain.

In some embodiments, various types of digital predistortion processing in the symbol domain may be used.

For example, digital predistortion in the symbol domain may be based on either an indirect learning (IDL) architecture or a direct learning (DL) architecture.

For example, the digital predistorter model may be a Volterra series, or may also be a simplified form of the Volterra series, such as a memory polynomial, a Winner model, or a Hammerstein model, or may be a lookup table (LUT). In this embodiment, the digital predistorter model shall be described by taking a Volterra series as an example.

For symbol domain predistortion, pulse shaping and a subsequent transmitter hardware system may be deemed as a nonlinear system with memory as a whole. A memory length of the nonlinear system will be affected by the memory effect introduced by pulse shaping to a large extent, leading to increase of complexity of digital predistortion in the symbol domain. It is assumed that the memory length of the nonlinear system is M in units of symbols, and a nonlinear order is K.

For example, when the digital predistorter model is a Volterra series, when successful digital predistortion needs to be performed, that is, certain predistortion performance requirements need to be satisfied, the memory length and nonlinear order requirements for the Volterra series will also be no less than M and K. In this case, a mathematical expression for a discrete time Volterra series is as follows:

$$y(n) = \sum_{k=1}^{K}\left[\sum_{m_1=0}^{M-1}\sum_{m_2=0}^{M-1}\cdots\sum_{m_k=0}^{M-1}h_k \right. \tag{1}$$
$$\left. (m_1, m_2, \ldots, m_k)\prod_{l=1}^{k}x(n-m_l)\right] + h_0;$$

where, M and K respectively denote the memory length and nonlinear order of the Volterra series, and $h_k(m_1, m_2, \ldots, m_k)$ are Volterra kernel coefficients.

The number of the kernel coefficients directly reflects the complexity of digital predistortion in the symbol domain, and the number of the kernel coefficients may be expressed as $$p = \frac{(K+M)!}{K!M!}.$$

It can be seen that a magnitude of p will be expanded rapidly with the increase of the memory length M, that is, the complexity of digital predistortion in the symbol domain increases rapidly.

Likewise, for example, when LUT is used for digital predistortion, when successful digital predistortion needs to be performed, that is, certain predistortion performance requirements need to be satisfied, the memory length of LUT needs also to be M. Assuming a modulation format of a signal to be transmitted is PAM-K, a size of the LUT is $K^M$, its magnitude will be exponentially expanded with the increase of M, leading to an increase in the complexity of digital predistortion.

In the embodiment of this disclosure, the complexity of digital predistortion is significantly reduced by shortening the memory length.

After obtaining the digital predistortion processed signal by the predistortion unit 110, the pulse shaping unit 120 performs short pulse shaping processing on the digital predistortion processed signal.

In some embodiments, the short pulse shaping processing is different from the conventional long pulse shaping processing, and makes a time domain duration of the generated signal pulse relatively short, that is, a trailing attenuation of the generated signal pulse is fast and a swing thereof is small. That is, the used pulse shaping filter has a relatively large bandwidth and edge roll-off of a passband is gentle.

In some embodiments, a method for determining whether the pulse shaping processing belongs to the short pulse shaping processing is that the memory length introduced by the short pulse shaping processing is less than or equal to a memory length of the device of the optical transmitter itself.

In addition, a filter used in conventional long pulse shaping has a relatively small roll-off coefficient, such as 0.15; and the filter used for the short pulse shaping has a relatively large roll-off coefficient, such as 1.

In some embodiments, short pulse shaping processing may be performed in a digital domain or in an analog domain, which shall respectively be explained below in detail.

The short pulse shaping processing in the digital domain shall be described first.

In some embodiments, the pulse shaping unit 120 performs short-pulse shaping processing on the digital predistortion-processed signal in the digital domain to obtain a short-pulse shaping processed digital signal.

Figure 2:
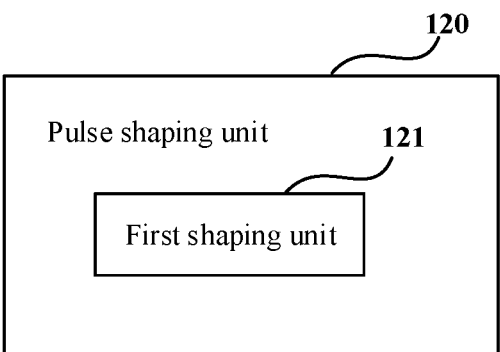
FIG. 2 is a schematic diagram of implementation of the pulse shaping unit according to an embodiment of this disclosure.

FIG. 2 is a schematic diagram of implementation of the pulse shaping unit of Embodiment 1 of this disclosure. As shown in FIG. 2, the pulse shaping unit 120 includes:

a first shaping unit 121 configured to perform short-pulse shaping processing on the digital predistortion-processed signal by using a finite impulse response (FIR) digital filter.

Figure 3:
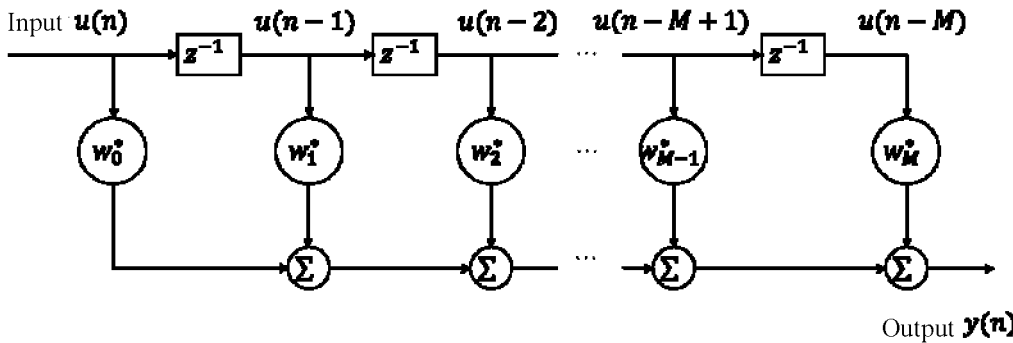
FIG. 3 is a schematic diagram of a structure of an FIR digital filter according to an embodiment of this disclosure.

FIG. 3 is a schematic diagram of a structure of the FIR digital filter of Embodiment 1 of this disclosure. As shown in FIG. 3, a signal inputted into the FIR filter is u(n), and a signal outputted by the FIR filter is y(n).

Processing of the FIR digital filter may be represented by expression (2) below:

$$y(n) = \sum_{k=0}^{N-1} w_k^* u(n-k). \tag{2}$$

In FIG. 3 and expression (2), $$w_k^*$$

is a tap coefficient, N is an order of the filter, and N is related to a memory length. That is, for example, the memory length introduced by the pulse shaping processing may be adjusted by adjusting the order of the FIR filter, i.e. making the pulse shaping processing to be short pulse shaping processing, and the memory length introduced by the short pulse shaping processing is less than or equal to the memory length of the device of the optical transmitter itself.

In some embodiments, the memory length of the device of the optical transmitter itself is related to its transfer function, hence, it may be directly obtained by measuring its frequency response.

In some embodiments, devices of the optical transmitter mainly include an analog-to-digital converter, a driving amplifier, and an optical modulator.

In a case where the pulse shaping unit 120 performs short pulse shaping on the digital predistortion processed signal in the digital domain, the optical signal generating unit 130 performs digital to analog conversion and then performs amplification and loading.

Figure 4:
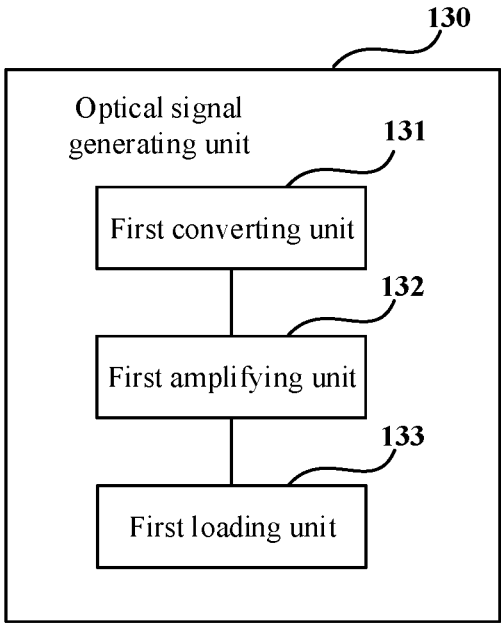
FIG. 4 is a schematic diagram of implementation of the optical signal generating unit according to an embodiment of this disclosure.

FIG. 4 is a schematic diagram of implementation of the optical signal generating unit of Embodiment 1 of this disclosure.

As shown in FIG. 4, the optical signal generating unit 130 includes:

a first converting unit 131 configured to convert the short-pulse shaped digital signal into an analog electrical signal by using a digital-to-analog converter;

a first amplifying unit 132 configured to amplify the analog electrical signal by using a driver amplifier to obtain an amplified analog electrical signal; and a first loading unit 133 configured to load the amplified analog electrical signal onto an optical carrier by using an optical modulator to generate and transmit the optical signal.

In some embodiments, a modulation scheme of the optical modulator may be based on an external modulation scheme, or may be a direct modulation scheme.

In some embodiments, the pulse shaping unit 120 may also perform short-pulse shaping processing on the digital predistortion processed signal in an analog domain to obtain a short-pulse shaping processed analog electrical signal.

Figure 5:
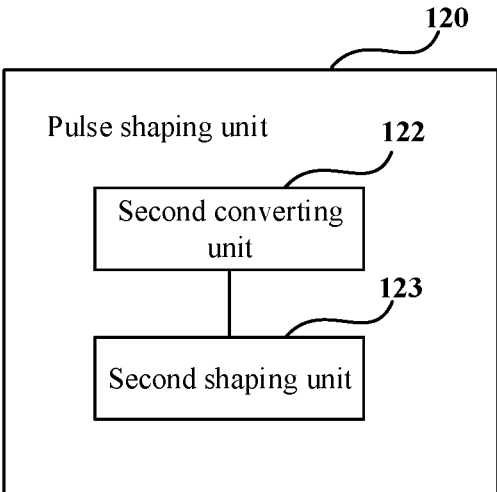
FIG. 5 is a schematic diagram of another implementation of the pulse shaping unit according to an embodiment of this disclosure.

FIG. 5 is a schematic diagram of another implementation of the pulse shaping unit of Embodiment 1 of this disclosure. As shown in FIG. 5, the pulse shaping unit 120 includes:

a second converting unit 122 configured to convert the digital predistortion processed signal into an analog electrical signal by using a digital-to-analog converter; and a second shaping unit 123 configured to perform short-pulse shaping processing on the analog electrical signal by using an analog electrical filter to obtain a short-pulse shaping processed analog electrical signal.

In some embodiments, the second shaping unit 123 may use analog electric filters of various analog circuits.

In a case where the pulse shaping unit 120 performs short pulse shaping processing on the digital predistortion processed signal in the analog domain, the optical signal generating unit 130 directly performs amplification and loading.

Figure 6:
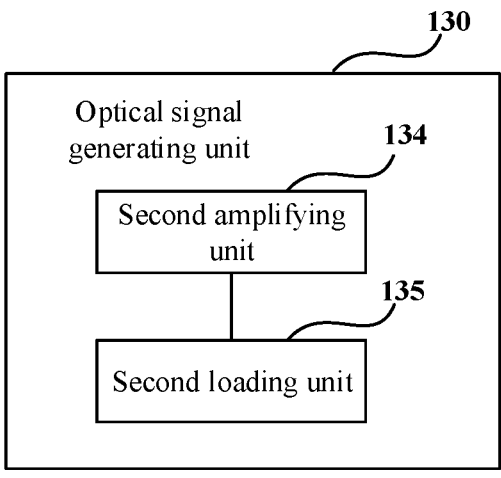
FIG. 6 is a schematic diagram of another implementation of the optical signal generating unit according to an embodiment of this disclosure.

FIG. 6 is a schematic diagram of another implementation of the optical signal generating unit of Embodiment 1 of this disclosure. As shown in FIG. 6, the optical signal generating unit 130 includes:

a second amplifying unit 134 configured to amplify the short-pulse shaping processed analog electrical signal by using a driver amplifier; and a second loading unit 135 configured to load the amplified signal onto an optical carrier by using the optical modulator to generate and transmit the optical signal.

In some embodiments, a modulation scheme of the optical modulator may be based on an external modulation scheme, or may be a direct modulation scheme.

After the optical signal is generated by the optical signal generating unit 130, the transmitting unit 140 transmits the generated optical signal.

In some application scenarios, there is no requirement for a spectral width of the signal, such as a single-wavelength communication system. Therefore, in such scenarios, even if the short pulse shaping processing results in a larger spectral bandwidth occupied by the signal, the impact on performances of the system will be small.

In some application scenarios, there are certain requirements for the spectral bandwidth of the signal, such as a wavelength division multiplexing (WDM) system.

In these scenarios, filtering processing may be performed on the generated optical signal, i.e. the optical signal generated by the optical signal generating unit 130. In this way, the spectrum bandwidth occupied by the signal may be reduced, thereby avoiding crosstalk to signals of neighboring channels.

Figure 7:
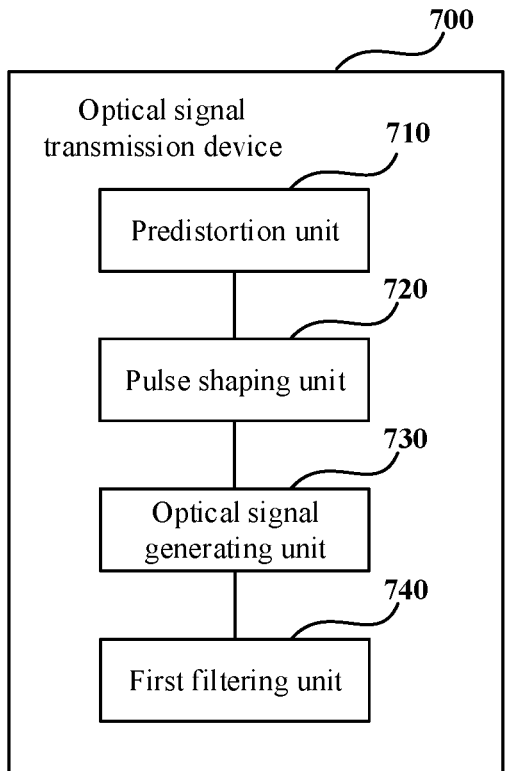
FIG. 7 is another schematic diagram of the optical signal transmission device based on digital predistortion in a symbol domain according to an embodiment of this disclosure.

FIG. 7 is another schematic diagram of the optical signal transmission device based on digital predistortion in a symbol domain of Embodiment 1 of this disclosure. As shown in FIG. 7, an optical signal transmission device 700 includes:

a predistortion unit 710 configured to perform digital predistortion processing on a symbol sequence of a signal to be transmitted to obtain a digital predistortion processed signal;

a pulse shaping unit 720 configured to perform short-pulse shaping processing on the digital predistortion processed signal to obtain a short-pulse shaping processed signal, wherein a memory length introduced by the short-pulse shaping processing is less than or equal to a memory length of the device of the optical transmitter itself;

an optical signal generating unit 730 configured to generate an optical signal based on the short-pulse shaping processed signal; and a first filtering unit 740 configured to filter the generated optical signal by using an optical filter to reduce a spectral bandwidth occupied by the optical signal, and transmit the optical signal with reduced spectral bandwidth.

In some embodiments, the predistortion unit 710, pulse shaping unit 720, optical signal generating unit 730 have the same functions as corresponding units in FIG. 1, which shall not be repeated herein any further.

In some embodiments, the first filtering unit 740 uses the optical filter to filter the modulated optical signal in an optical domain.

For example, the optical filter is a simple multiplexer (MUX) filter, or may also be a wavelength selection switch (WSS) with a special band response shape or a cascaded asymmetric Mach-Zehnder triplet (CAT) filter. A specific type of the optical filter is not limited in the embodiment of this disclosure.

In some application scenarios, there are certain requirements for a spectral bandwidth and power of the signal. In these scenarios, the generated optical signal, i.e. the optical signal generated by the optical signal generating unit 130, may be filtered and amplified. In this way, the spectrum bandwidth occupied by the signal may be reduced, thereby avoiding crosstalk to signals of neighboring channels, and power of the transmitted optical signal may be increased to meet the requirements for power.

Figure 8:
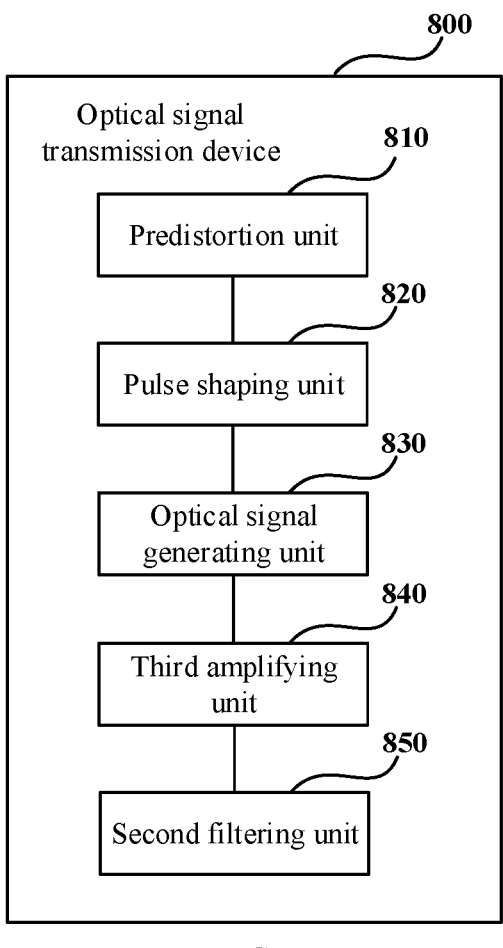
FIG. 8 is a further schematic diagram of the optical signal transmission device based on digital predistortion in a symbol domain according to an embodiment of this disclosure.

FIG. 8 is a further schematic diagram of the optical signal transmission device based on digital predistortion in a symbol domain of Embodiment 1 of this disclosure. As shown in FIG. 8, the optical signal transmission device 800 includes:

a predistortion unit 810 configured to perform digital predistortion processing on a symbol sequence of a signal to be transmitted to obtain a digital predistortion processed signal;

a pulse shaping unit 820 configured to perform short-pulse shaping processing on the digital predistortion processed signal to obtain a short-pulse shaping processed signal, wherein a memory length introduced by the short-pulse shaping processing is less than or equal to a memory length of the device of the optical transmitter itself;

an optical signal generating unit 830 configured to generate an optical signal based on the short-pulse shaping processed signal;

a third amplifying unit 840 configured to perform power amplification processing on the generated optical signal by using an optical amplifier; and a second filtering unit 850 configured to perform filtering processing on the power amplified optical signal by using an optical filter to reduce a spectral bandwidth occupied by the optical signal, and transmits the optical signal with a reduced spectral bandwidth.

In some embodiments, the predistortion unit 810, pulse shaping unit 820, optical signal generating unit 830 have the same functions as corresponding units in FIG. 1, which shall not be repeated herein any further.

In some embodiments, the second filtering unit 850 may be identical to the first filtering unit 740, which shall not be repeated herein any further.

In some embodiments, the third amplifying unit 840 boosts the input optical signal to increase power of the emitted optical signal.

For example, the optical amplifier may be a semiconductor optical amplifier with a relatively poor noise characteristic, or may be other low-cost optical amplifiers. A specific type of the optical amplifier is not limited in the embodiment of this disclosure.

Figure 9:
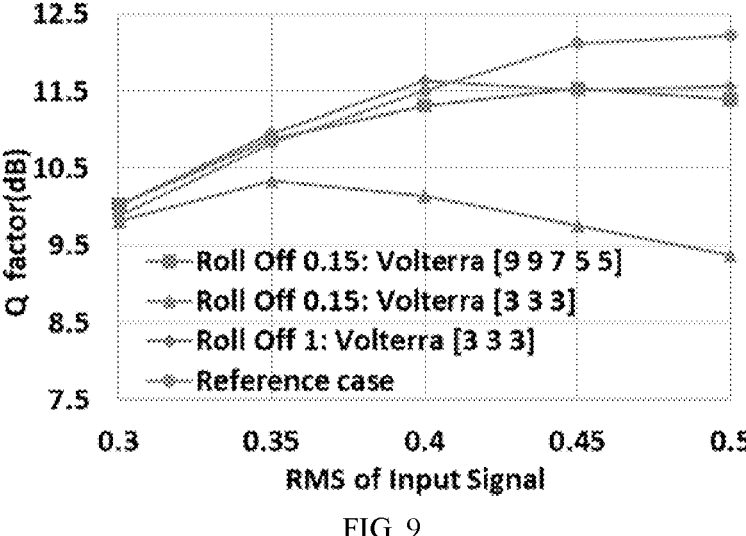
FIG. 9 is a schematic diagram of comparison between performances of digital predistortion in different pulse shaping schemes according to an embodiment of this disclosure.

FIG. 9 is a schematic diagram of comparison between performances of digital predistortion in different pulse shaping schemes. As shown in FIG. 9, taking sine modulation nonlinearity as an example, there exists a significant difference between nonlinear compensation performances of different digital predistortions when long pulse shaping (for example, a roll-off coefficient=0.15) and short pulse shaping (for example, a roll-off coefficient=1) are respectively used. Wherein, the abscissa represents a root mean square (RMS) of the input signal, and the ordinate Q factor represents the performance of digital predistortion; and the reference example represents an upper limit of compensation for digital predistortion without considering complexity. Wherein, a magnitude of the nonlinear distortion introduced by the sine modulation is closely related to the root mean square value of the input signal.

It can be seen that for short pulse shaping (for example, a roll-off coefficient=1), use of a Volterra series (the number of free fitting parameters is 19) with a memory length combination of [3 3 3] as a predistorter may compensate for most of nonlinear costs.

For long pulse shaping (for example, a roll-off coefficient=0.15), it is needed to use a Volterra series (the number of free fitting parameters is 334) with a memory length combination of [9 9 7 5 5] to achieve comparable performance, thus greatly increasing the complexity of digital predistortion; and when a low complexity predistorter is still used, that is, a Volterra series (the number of free fitting parameters is 19) with a memory length combination of [3 3 3] is used as a predistorter, the performance will be poor.

It can be seen from the above embodiment that in the optical transmitter based on digital predistortion in the symbol domain, the digital predistortion processed signal is subject to short pulse shaping processing different from the conventional long pulse shaping processing, wherein the memory length introduced by the short pulse shaping processing is less than or equal to the memory length of the device of the optical transmitter itself. In this way, with the above short pulse shaping, the length of the correlation introduced between earlier and later symbols of the signal pulse in time is shortened and the intensity of this correlation is reduced, hence, the length of the memory effect of the entire optical transmitter may be shortened, thus effectively reducing complexity requirements of digital predistortion in the symbol domain, facilitating actual deployment, and ensuring the performance of digital predistortion.

Embodiment 2

The embodiment of this disclosure provides an optical transmitter. FIG. 10 is a schematic diagram of the optical transmitter of Embodiment 2 of this disclosure. As shown in FIG. 10, an optical transmitter 1000 includes an optical signal transmission device 1001 based on digital predistortion in a symbol domain. A structure and function of then optical signal transmission device 1001 based on digital predistortion in a symbol domain are the same as those described in Embodiment 1, i.e. the optical signal transmission device 100 or the optical signal transmission device 700 or the optical signal transmission device 900, which shall not be repeated herein any further.

FIG. 11 is a block diagram of a systematic structure of the optical transmitter of Embodiment 2 of this disclosure. As shown in FIG. 11, an optical transmitter 10 includes the components of the optical signal transmission device, i.e. the predistortion unit 110, the pulse shaping unit 120, the optical signal generating unit 130, and the transmitting unit 140. The predistortion unit 110 performs digital predistortion processing on a symbol sequence of a signal to be transmitted by using a digital predistorter to obtain a digital predistortion processed signal, the pulse shaping unit 120 performs short pulse shaping processing on the digital predistortion processed signal by using a FIR digital filter. In the optical signal generating unit 130, a DAC is used first to convert the short pulse shaping processed digital signal into an analog electrical signal, and then a driver amplifier is used to amplify the analog electrical signal to obtain an amplified analog electrical signal, then an optical modulator is used to load the amplified analog electrical signal onto an optical carrier to generate and transmit the optical signal.

FIG. 12 is another block diagram of the systematic structure of the optical transmitter of Embodiment 2 of this disclosure. As shown in FIG. 12, an optical transmitter 10' includes the components of the optical signal transmission device, i.e. the predistortion unit 110, the pulse shaping unit 120, the optical signal generating unit 130, and the transmitting unit 140. The predistortion unit 110 performs digital predistortion processing on a symbol sequence of a signal to be transmitted by using a digital predistorter to obtain a digital predistortion processed signal. In the pulse shaping unit 120, a DAC is used first to convert the digital predistortion processed signal into an analog electrical signal, and then an analog electrical filter is used to perform short pulse shaping processing on the analog electrical signal to obtain a short pulse shaping processed analog electrical signal. In the optical signal generating unit 130, a driving amplifier is used first to amplify the analog electrical signal to obtain an amplified analog electrical signal, then an optical modulator is used to load the amplified analog electrical signal onto an optical carrier to generate and transmit the optical signal.

It can be seen from the above embodiment that in the optical transmitter based on digital predistortion in the symbol domain, the digital predistortion processed signal is subject to short pulse shaping processing different from the conventional long pulse shaping processing, wherein the memory length introduced by the short pulse shaping processing is less than or equal to the memory length of the device of the optical transmitter itself. In this way, with the above short pulse shaping, the length of the correlation introduced between earlier and later symbols of the signal pulse in time is shortened and the intensity of this correlation is reduced, hence, the length of the memory effect of the entire optical transmitter may be shortened, thus effectively reducing complexity requirements of digital predistortion in the symbol domain, facilitating actual deployment, and ensuring the performance of digital predistortion.

Embodiment 3

The embodiment of this disclosure provides an optical signal transmission method based on digital predistortion in a symbol domain, corresponding to the optical signal transmission device based on digital predistortion in a symbol domain in Embodiment 1. FIG. 13 is schematic diagram of the optical signal transmission method based on digital predistortion in a symbol domain of Embodiment 3 of this disclosure. As shown in FIG. 13, the method includes:

operation 1301: performing digital predistortion processing on a symbol sequence of a signal to be transmitted to obtain a digital predistortion processed signal;

operation 1302: performing short-pulse shaping processing on the digital predistortion processed signal to obtain a short-pulse shaping processed signal, wherein a memory length introduced by the short-pulse shaping processing is less than or equal to a memory length of the optical transmitter itself; and operation 1303: generating and transmitting an optical signal based on the short-pulse shaping processed signal.

In this embodiment, implementations the above operations are identical to those described in Embodiment 1, which shall not be repeated herein any further.

It can be seen from the above embodiment that in the optical transmitter based on digital predistortion in the symbol domain, the digital predistortion processed signal is subject to short pulse shaping processing different from the conventional long pulse shaping processing, wherein the memory length introduced by the short pulse shaping processing is less than or equal to the memory length of the device of the optical transmitter itself. In this way, with the above short pulse shaping, the length of the correlation introduced between earlier and later symbols of the signal pulse in time is shortened and the intensity of this correlation is reduced, hence, the length of the memory effect of the entire optical transmitter may be shortened, thus effectively reducing complexity requirements of digital predistortion in the symbol domain, facilitating actual deployment, and ensuring the performance of digital predistortion.

An embodiment of this disclosure provides a computer readable program, which, when executed in an optical signal transmission device based on digital predistortion in a symbol domain or an optical transmitter, will cause a computer to carry out the optical signal transmission method based on digital predistortion in a symbol domain as described in Embodiment 3 in the optical signal transmission device based on digital predistortion in a symbol domain or the optical transmitter.

An embodiment of this disclosure provides a computer readable medium, including a computer readable program code, which will cause a computer to carry out the optical signal transmission method based on digital predistortion in a symbol domain as described in Embodiment 3 in an optical signal transmission device based on digital predistortion in a symbol domain or an optical transmitter.

The optical signal transmission method based on digital predistortion in a symbol domain executed in the optical signal transmission device based on digital predistortion in a symbol domain or the optical transmitter described with reference to the embodiments of this disclosure may be directly embodied as hardware, software modules executed by a processor, or a combination thereof. For example, one or more functional block diagrams and/or one or more combinations of the functional block diagrams shown in FIG. 1 may either correspond to software modules of procedures of a computer program, or correspond to hardware modules. Such software modules may respectively correspond to the operations shown in FIG. 13. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIG. 1 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in FIG. 1 may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

Following supplements are further disclosed in the embodiments of this disclosure.

1. An optical signal transmission method based on digital predistortion in a symbol domain, the method being applicable to an optical transmitter, and the method comprising:

performing digital predistortion processing on a symbol sequence of a signal to be transmitted to obtain a digital predistortion processed signal;

performing short-pulse shaping processing on the digital predistortion processed signal to obtain a short-pulse shaping processed signal, wherein a memory length introduced by the short-pulse shaping processing is less than or equal to a memory length of the optical transmitter itself; and generating and transmitting an optical signal based on the short-pulse shaping processed signal.

2. The method according to supplement 1, wherein the performing short-pulse shaping processing on the digital predistortion processed signal comprises:

performing short-pulse shaping processing on the digital predistortion-processed signal in a digital domain to obtain a short-pulse shaping processed digital signal.

3. The method according to supplement 2, wherein the performing short-pulse shaping processing on the digital predistortion-processed signal in a digital domain comprises:

performing short-pulse shaping processing on the digital predistortion-processed signal by using a finite impulse response (FIR) digital filter.

4. The method according to supplement 2, wherein the generating an optical signal based on the short-pulse shaping processed signal comprises:

converting the short-pulse shaped digital signal into an analog electrical signal by using a digital-to-analog converter;

amplifying the analog electrical signal by using a driver amplifier to obtain an amplified analog electrical signal; and loading the amplified analog electrical signal onto an optical carrier by using an optical modulator to generate and transmit the optical signal.

5. The method according to supplement 1, wherein the performing short-pulse shaping processing on the digital predistortion-processed signal comprises:

performing short-pulse shaping processing on the digital predistortion processed signal in an analog domain to obtain a short-pulse shaping processed analog electrical signal.

6. The method according to supplement 5, wherein the performing short-pulse shaping processing on the digital predistortion processed signal in an analog domain comprises:

converting the digital predistortion processed signal into an analog electrical signal by using a digital-to-analog converter; and performing short-pulse shaping processing on the analog electrical signal by using an analog electrical filter to obtain a short-pulse shaping processed analog electrical signal.

7. The method according to supplement 6, wherein the generating an optical signal based on the short-pulse shaping processed signal comprises:

amplifying the short-pulse shaping processed analog electrical signal by using a driver amplifier; and loading the amplified signal onto an optical carrier by using the optical modulator to generate and transmit the optical signal.

8. The method according to supplement 1, wherein the method further comprises:

performing filtering processing on the generated optical signal by using an optical filter to reduce a spectral bandwidth occupied by the optical signal, to transmit the optical signal with a reduced spectral bandwidth.

9. The method according to supplement 1, wherein the method further comprises:

performing power amplifying processing on the generated optical signal by using an optical amplifier; and performing filtering processing on a power amplified optical signal by using an optical filter to reduce a spectral bandwidth occupied by the optical signal, to transmit the optical signal with a reduced spectral bandwidth.

What is claimed is:

1. An optical signal transmission device based on digital predistortion in a symbol domain, the optical signal transmission device being arrangeable in an optical transmitter, the optical signal transmission device comprising:

a memory; and a digital processor coupled to the memory to control execution of a process to:

perform digital predistortion processing on a symbol sequence of a signal to be transmitted to obtain a digital predistortion processed signal;

perform short-pulse shaping processing on the digital predistortion processed signal to obtain a digital short-pulse shaping processed signal, a trailing attenuation of the digital short-pulse shaping processed signal pulse being fast and a swing of the digital short-pulse shaping processed signal pulse being small, a memory length introduced by the digital short-pulse shaping processing is less than or equal to a memory length of the optical transmitter; and generate and transmit an optical signal based on the digital short-pulse shaping processed signal.

2. The optical signal transmission device according to claim 1, wherein the digital processor performs short-pulse shaping processing on the digital predistortion processed signal in a digital domain to obtain a short-pulse shaping processed digital signal.

3. The optical signal transmission device according to claim 2, wherein the digital processor performs short-pulse shaping processing on the digital predistortion processed signal by using a finite impulse response digital filter.

4. The optical signal transmission device according to claim 3, wherein the digital processor:

converts the short-pulse shaped signal into an analog electrical signal by using a digital-to-analog converter;

amplifies the analog electrical signal by using a driver amplifier to obtain an amplified analog electrical signal; and loads the amplified analog electrical signal onto an optical carrier by using an optical modulator to generate and transmit the optical signal.

5. The optical signal transmission device according to claim 1, wherein the digital processor:

performs filtering processing on the generated optical signal by using an optical filter to reduce a spectral bandwidth occupied by the optical signal, to transmit the optical signal with a reduced spectral bandwidth.

6. The optical signal transmission device according to claim 1, wherein the digital processor:

performs power amplifying processing on the generated optical signal by using an optical amplifier; and performs filtering processing on a power amplified optical signal by using an optical filter to reduce a spectral bandwidth occupied by the optical signal, to transmit the optical signal with a reduced spectral bandwidth.

7. An optical transmitter, which comprises the optical signal transmission device according to claim 1.

8. The optical signal transmission device according to claim 1, wherein the digital processor performs short-pulse shaping processing on the digital predistortion processed signal to obtain the short-pulse shaping processed signal, a filter used in the short-pulse shaping has a larger roll-off coefficient than a filter used in long-pulse shaping.

9. An optical signal transmission device based on digital predistortion in a symbol domain, the optical signal transmission device being arrangeable in an optical transmitter, the optical signal transmission device comprising:

a memory; and a processor coupled to the memory to control execution of a process to:

perform digital predistortion processing on a symbol sequence of a signal to be transmitted to obtain a digital predistortion processed signal;

perform short-pulse shaping processing on the digital predistortion processed signal to obtain a short-pulse shaping processed signal, a trailing attenuation of the short-pulse shaping processed signal pulse being fast and a swing of the short-pulse shaping processed signal pulse being small, a memory length introduced by the short-pulse shaping processing is less than or equal to a memory length of the optical transmitter, a filter used in the short-pulse shaping has a larger roll-off coefficient than a filter used in long-pulse shaping; and generate an optical signal based on the short-pulse shaping processed signal;

perform filtering processing on the generated optical signal by using an optical filter to reduce a spectral bandwidth occupied by the optical signal, to transmit the optical signal with a reduced spectral bandwidth.

\* \* \* \* \*